(12) United States Patent
Kim et al.

(10) Patent No.: US 10,777,122 B2
(45) Date of Patent: Sep. 15, 2020

(54) ELECTROLUMINESCENCE DISPLAY DEVICE AND DRIVING METHOD THEREOF

(71) Applicant: LG DISPLAY CO., LTD., Seoul (KR)

(72) Inventors: Jongkyung Kim, Paju-si (KR); YongMin Ha, Paju-si (KR); Taro Hasumi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/224,178

(22) Filed: Dec. 18, 2018

(65) Prior Publication Data

US 2019/0197944 A1   Jun. 27, 2019

(30) Foreign Application Priority Data

Dec. 27, 2017 (KR) .................. 10-2017-0180535
Oct. 30, 2018 (KR) .................. 10-2018-0130354

(51) Int. Cl.
   *G09G 3/30* (2006.01)
   *G06K 9/00* (2006.01)
   *G09G 3/3225* (2016.01)

(52) U.S. Cl.
   CPC ............ *G09G 3/30* (2013.01); *G06K 9/0004* (2013.01); *G09G 3/3225* (2013.01); *G09G 2310/08* (2013.01); *G09G 2320/0626* (2013.01); *G09G 2320/0686* (2013.01); *G09G 2354/00* (2013.01); *G09G 2360/14* (2013.01)

(58) Field of Classification Search
   CPC combination set(s) only.
   See application file for complete search history.

(56) References Cited

U.S. PATENT DOCUMENTS

| | | | |
|---|---|---|---|
| 10,068,551 B1 * | 9/2018 | Choi | G09G 5/10 |
| 2016/0364888 A1 * | 12/2016 | Jeon | G09G 3/2003 |
| 2018/0096660 A1 * | 4/2018 | Liu | G09G 3/3648 |

* cited by examiner

*Primary Examiner* — Robin J Mishler
(74) *Attorney, Agent, or Firm* — Birch, Stewart, Kolasch & Birch, LLP

(57) ABSTRACT

A light emitting display device and a driving method thereof are provided, in which a luminance difference occurring in a boundary between a fingerprint scanning area and a non-fingerprint scanning area is not perceived by a user. The light emitting display device can include a display panel including a display area where a plurality of pixels is provided to display an image. The display area can include a first area, a second area, and a boundary area disposed between the first area and the second area. In a case where the display panel displays a predetermined image pattern, each of pixels in the first area can emit a first light having a first luminance, each of pixels in the second area can emit a second light having a second luminance lower than the first luminance or cannot emit any light, and the luminance of pixels in the boundary area can be progressively reduced from the first area to the second area.

13 Claims, 11 Drawing Sheets

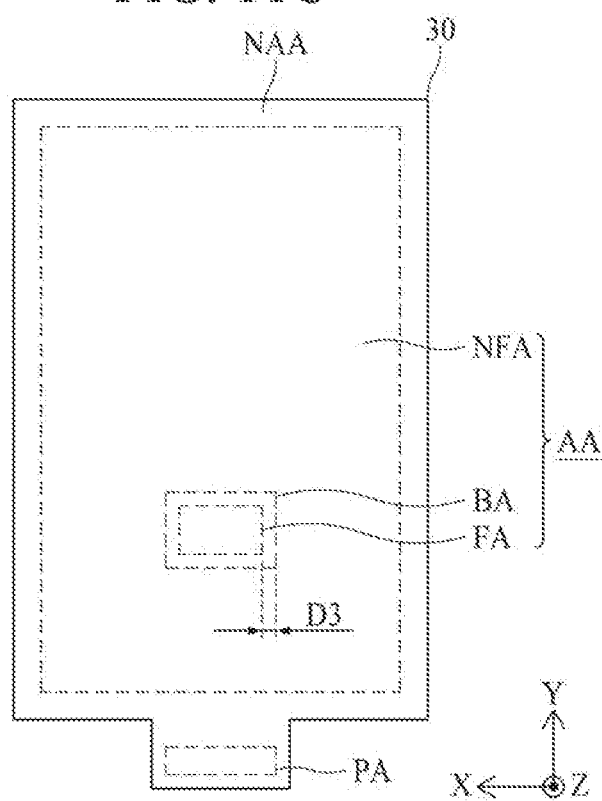

ELECTROLUMINESCENCE DISPLAY DEVICE AND DRIVING METHOD THEREOF

CROSS-REFERENCE TO RELATED APPLICATION

This disclosure claims the benefit of priority, under 35 U.S.C. § 119, to the Korean Patent Application No. 10-2017-0180535 filed in the Republic of Korea on Dec. 27, 2017 and Korean Patent Application No. 10-2018-0130354 filed in the Republic of Korea on Oct. 30, 2018, which are all incorporated by reference into the present application.

BACKGROUND

Field of the Invention

The present disclosure relates to an electroluminescence display device and a driving method thereof.

Discussion of the Related Art

With the advancement of information-oriented society, various requirements for display devices for displaying an image are increasing. Various display devices such as liquid crystal display (LCD) devices and electroluminescence display devices are being practically used. The electroluminescence display devices can be categorized into light emitting display devices, which use a light emitting layer as a light emitting element, and a Micro light emitting diode (LED) display devices which use a micro light emitting diode as a light emitting element. The electroluminescence display devices have characteristics where driving is performed with a low voltage, a thickness is thin, a viewing angle is good, and a response time is fast.

Electroluminescence display devices are being applied to various electronic devices such as smartphones, tablet personal computers (PCs), notebook computers, monitors, televisions (TVs), etc. Recently, the use of portable electronic devices such as smartphones, tablet PCs, and notebook computers has greatly increased due to the advancement of mobile communication technology. Portable electronic devices store privacy information such as contact numbers, call history, messages, photographs, memos, Web surfing information about a user, position information, and financial information, in addition to a communication function. Therefore, in order to prevent privacy information from being leaked from the portable electronic devices, various security methods for protecting the privacy information are being applied to the portable electronic devices. As an example of the various security methods, a fingerprint authentication method allows the use of an electronic device based on a fingerprint included in biometric information about a user, and thus, has the stability of security which is better than the other security methods (for example, a secret number authentication method, a pattern authentication method, etc.).

In portable electronic devices such as smartphones and tablet PCs, a bezel is minimized for providing a wider screen, and a size of a display area is enlarged. However, a display device, an image sensor for implementing a camera, an illumination sensor for sensing illumination, a fingerprint scanner for fingerprint authentication, and/or the like are disposed on a front surface of each of the portable electronic devices such as smartphones and tablet PCs, and thus, there is a limitation in enlarging the size of the display area.

If a fingerprint scanner is disposed in the display area, the size of the bezel area is reduced, and the size of the display area is enlarged. In this case, the fingerprint scanner is disposed on a rear surface of the display device and receives light, reflected by a fingerprint of a finger, among lights emitted from pixels provided in a fingerprint scanning area FA to identify the fingerprint. That is, since the fingerprint scanner disposed on the rear surface of the display device should receive the light reflected by the fingerprint of the finger, the pixels provided in the fingerprint scanning area FA should emit the lights having high luminances. Therefore, in a case where the display device displays a fingerprint scanning pattern for fingerprint scanning, there is a difference between the luminance of the pixels in the fingerprint scanning area FA and the luminance of pixels in a non-fingerprint scanning area NFA as in FIG. 1.

Therefore, there is a difference between the accumulated stresses of the pixels in the fingerprint scanning area FA and the accumulated stresses of the pixels in the non-fingerprint scanning area NFA. For this reason, even when the pixels in the fingerprint scanning area FA and the pixels in the non-fingerprint scanning area NFA display images having the same gray level, a luminance difference occurring in a boundary between the fingerprint scanning area FA and the non-fingerprint scanning area NFA is perceived by a user, which is undesirable.

SUMMARY

Accordingly, the present disclosure is directed to provide a light emitting display device and a driving method thereof that substantially obviate one or more problems due to limitations and disadvantages of the related art.

An aspect of the present disclosure is directed to provide a light emitting display device and a driving method thereof, in which a luminance difference occurring in a boundary between a fingerprint scanning area and a non-fingerprint scanning area is minimized and is not perceived by a user.

In addition to the aforesaid objects of the present disclosure, other features and advantages of the present disclosure will be described below, but will be clearly understood by those skilled in the art from descriptions below.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other advantages and in accordance with the purpose of the disclosure, as embodied and broadly described herein, there is provided a light emitting display device including a display panel including a display area where a plurality of pixels are provided to display an image. The display area can include a first area, a second area, and a boundary area disposed between the first area and the second area. In a case where the display panel displays a predetermined image pattern, each of pixels in the first area can emit the light having a first luminance, each of pixels in the second area can emit the light having a second luminance lower than the first luminance or cannot emit any light, and the of pixels in the boundary area can be progressively reduced from the first area to the second area.

In another aspect of the present disclosure, there is provided a driving method of a light emitting display device including a display panel, the driving method including when the display panel displays a fingerprint scanning pattern, a step of emitting, by each of pixels in a first area, the light having a first luminance, a step of emitting, by each of pixels in a second area, the light having a second luminance lower than the first luminance or stopping emission of light, and a step of emitting, by each of pixels in a boundary area between the first area and the second area, the light having a luminance which is reduced from the first area to the second area.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 11A, 11B, and 11C are plan views illustrating a fingerprint scanning area, a boundary area, and another region of a display area in operations S204 to S206 of FIG. 10.

DETAILED DESCRIPTION OF THE DISCLOSURE

Figure 1:
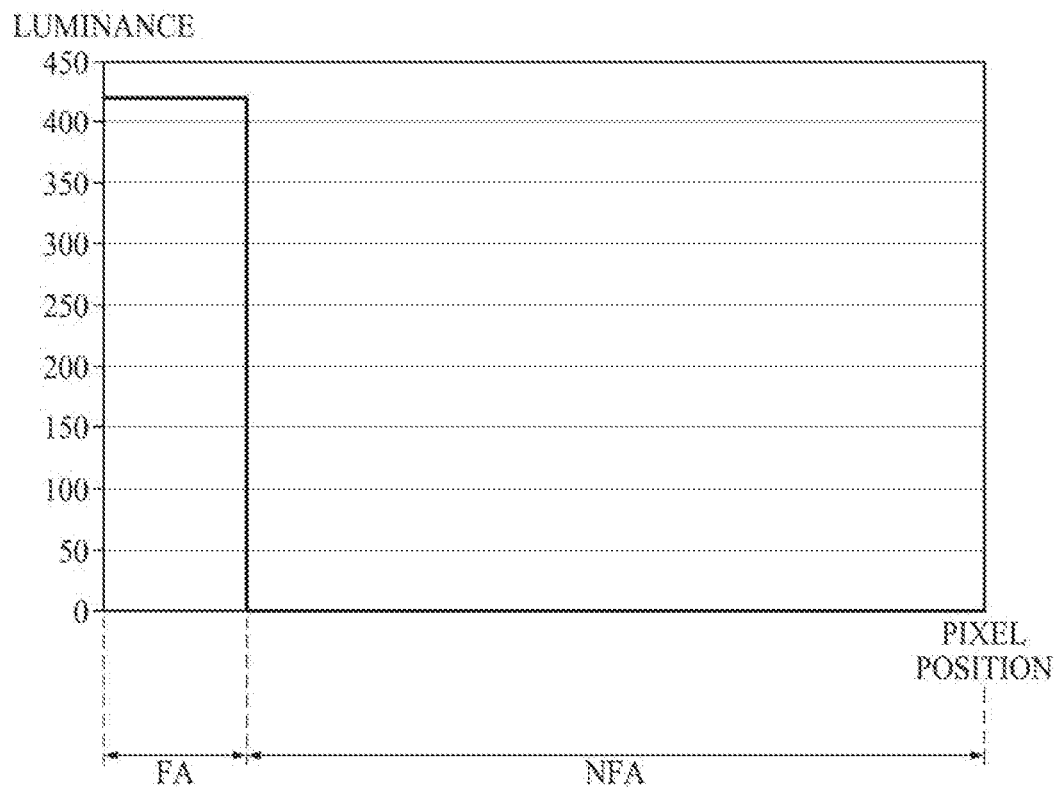
FIG. 1 is a graph showing a luminance of pixels in a fingerprint scanning area and another region when performing fingerprint scanning in a related art.

Reference will now be made in detail to the exemplary embodiments of the present disclosure, examples of which are illustrated in the accompanying drawings. Wherever possible, the same reference numbers will be used throughout the drawings to refer to the same or like parts.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In construing an element, the element is construed as including an error range although there is no explicit description.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, exemplary embodiments of the present disclosure will be described in detail with reference to the accompanying drawings.

Figure 2:
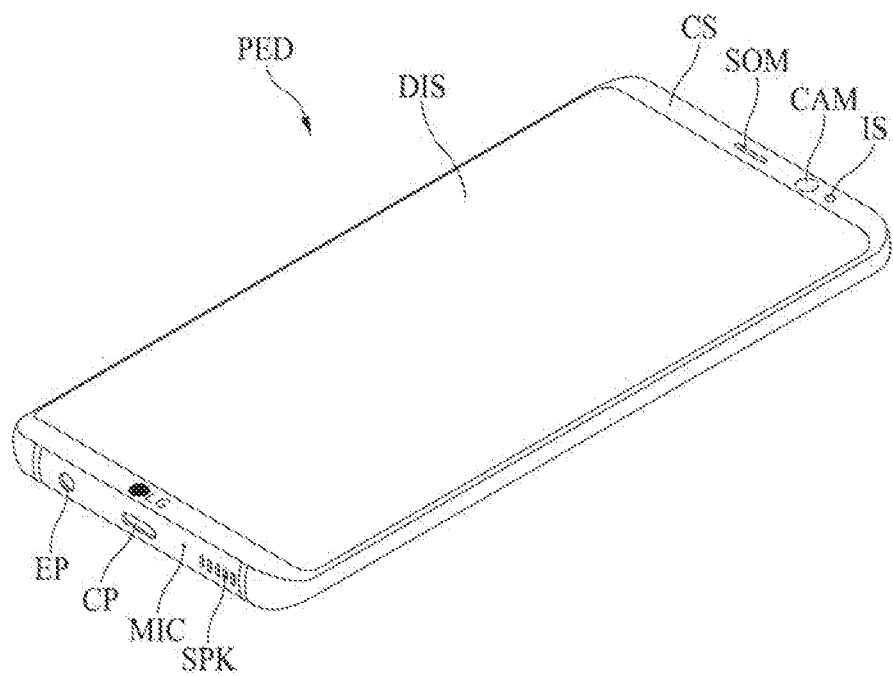
FIG. 2 is a perspective view illustrating a portable electronic device including a light emitting display device according to an embodiment of the present disclosure.

FIG. 2 is a perspective view illustrating a portable electronic device PED including a light emitting display device according to an embodiment of the present disclosure. All the components of the portable electronic device PED including the light emitting display device according to all embodiments of the present disclosure are operatively coupled and configured.

Referring to FIG. 2, the portable electronic device PED according to the embodiment of the present disclosure is illustrated as a smartphone, but is not limited thereto. For example, the portable electronic device PED according to an embodiment of the present disclosure can be a tablet PC, a notebook computer, a smart watch, a navigation device, a video/audio device, or the like. Also, the light emitting display device according to an embodiment of the present disclosure can be applied to all electronic devices such as monitors and televisions (TVs), in addition to the portable electronic device PED.

The portable electronic device PED can include a case CS forming an external appearance, a display device DIS, a sound output module SOM, an image sensor (or a camera) CAM, an illumination sensor IS, a speaker SPK, a microphone MIC, an earphone port EP, and a charging port CP.

The case CS can be provided to cover a front surface, a side surface, and a rear surface of the portable electronic device PED. The case CS can be formed of plastic. The display device DIS, the sound output module SOM, and the image sensor (or a camera) CAM, and the illumination sensor IS can be disposed on the front surface of the case CS. The microphone MIC, the earphone port EP, and the charging port CP can be disposed on one side surface of the case CS.

The display device DIS can occupy the most area of the front surface of the portable electronic device PED. The display device DIS will be described in detail with reference to FIGS. 3 and 4.

The sound output module SOM can be a reception device that outputs a sound of one or more parties when talking over a telephone. The image sensor CAM can be a device for capturing an image seen in front of the portable electronic device, and another image sensor can be additionally disposed on the rear surface of the portable electronic device PED. The illumination sensor IS can be a device which senses the amount of incident light to control illuminance of the display device DIS. The microphone MIC can be a transmission device which converts a sound wave of a voice of a user into an electrical signal when talking with one or more parties, and transmits the electrical signal. The speaker SPK can output a sound signal associated with an application or a function executed in the portable electronic device PED. The earphone port EP can be a port which, when an earphone is inserted into the port, outputs a sound signal to the earphone, instead of the speaker SPK. The charging port CP can be a port to which a charger for charging a battery of the portable electronic device PED is connected.

Figure 3:
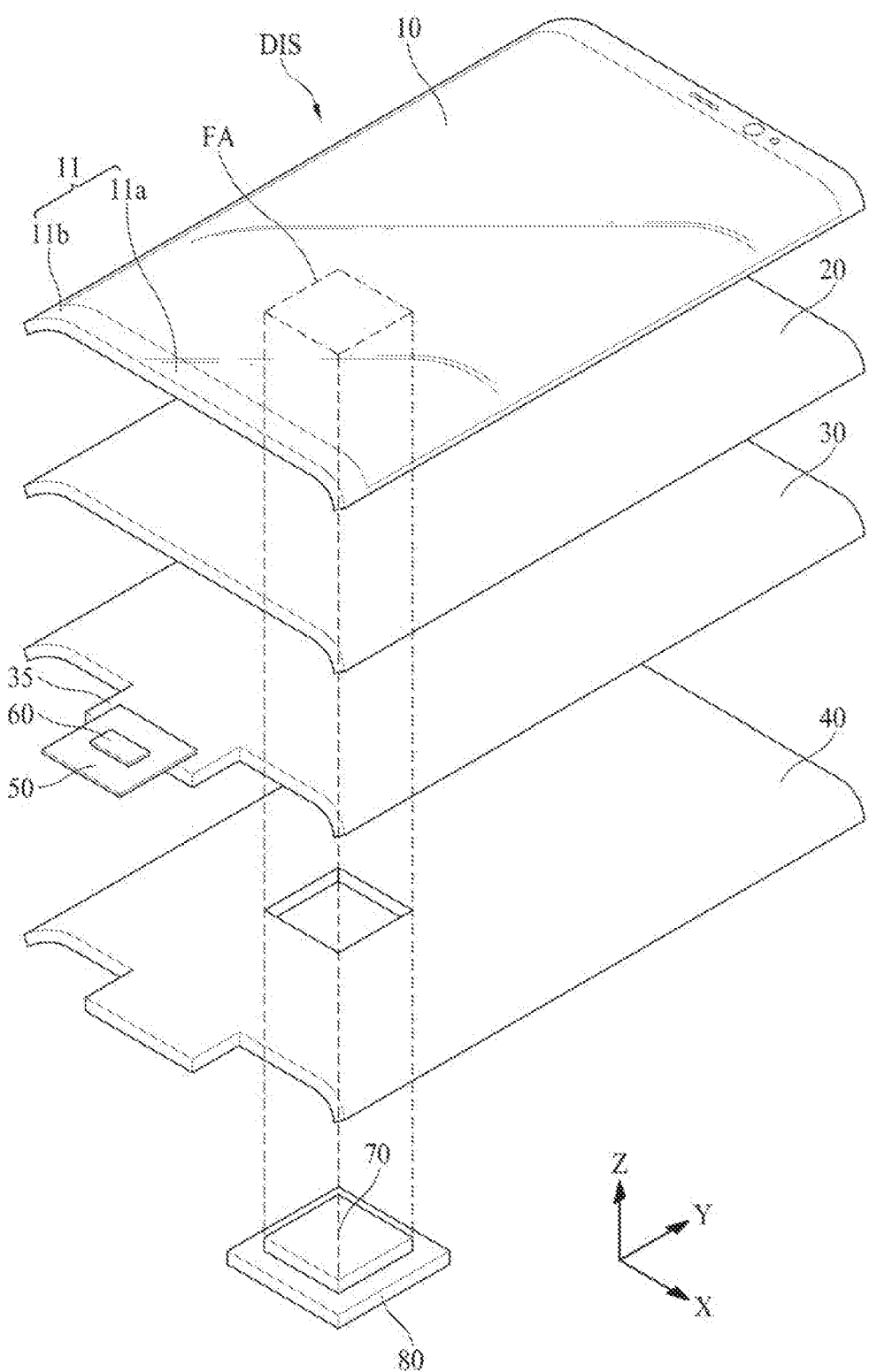
FIG. 3 is an exploded perspective view illustrating a light emitting display device according to an embodiment of the present disclosure.
Figure 4:
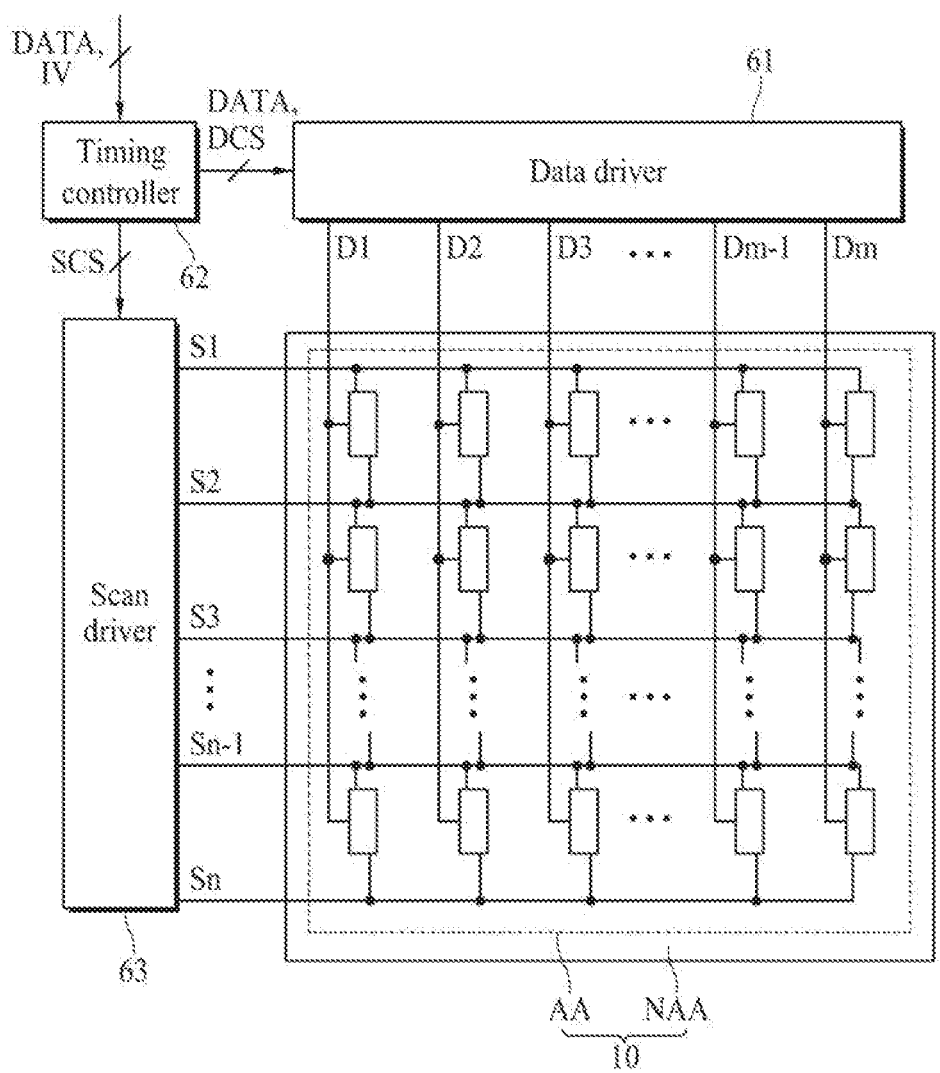
FIG. 4 is a block diagram illustrating a light emitting display device according to an embodiment of the present disclosure.
Figure 5:
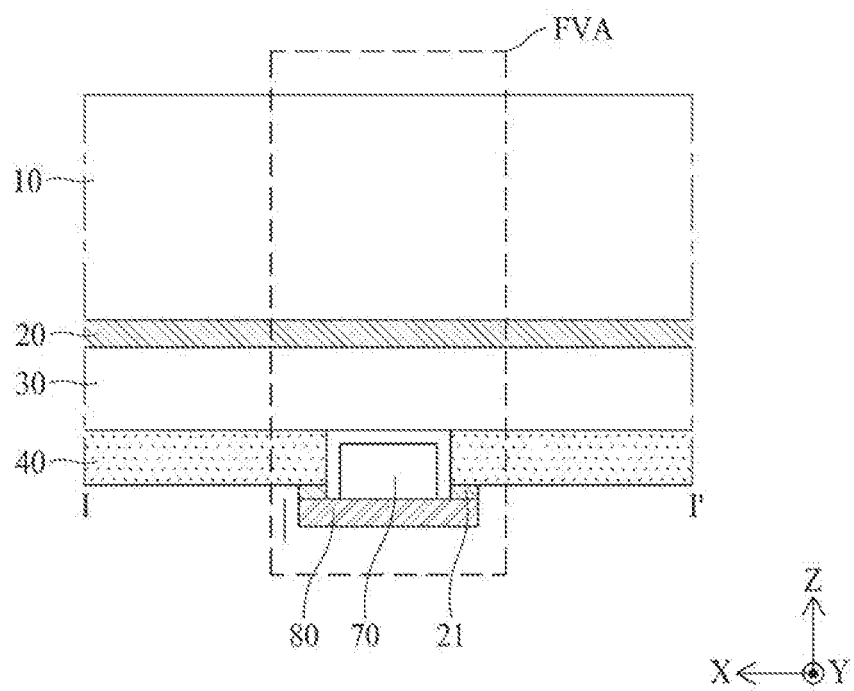
FIG. 5 is a cross-sectional view illustrating an example of a light emitting display device in a fingerprint scanning area.

FIG. 3 is an exploded perspective view illustrating a light emitting display device according to an embodiment of the present disclosure. FIG. 4 is a block diagram illustrating a light emitting display device according to an embodiment of the present disclosure. FIG. 5 is a cross-sectional view illustrating an example of a light emitting display device in a fingerprint scanning area.

Referring to FIGS. 3 to 5, an example where the light emitting display device according to an embodiment of the present disclosure is an organic light emitting display device using an organic light emitting diode as a light emitting element will be described, but embodiments of the present disclosure are not limited thereto. In other embodiments, the light emitting display device according to an embodiment of the present disclosure can be a micro light emitting display device which uses a micro light emitting diode as a light emitting element. Also, FIG. 3 illustrates an example where the light emitting display device according to an embodiment of the present disclosure is implemented as a curved display device, but embodiments of the present disclosure are not limited thereto.

The display device according to an embodiment of the present disclosure can include a cover substrate 10, an adhesive film 20, a display panel 30, a heat dissipation film 40, a flexible film 50, an integration control unit 60, a fingerprint scanner 70, and a circuit board 80. The integration control unit 60 can include a data driving circuit 61 and a timing control circuit 62.

The cover substrate 10 can be formed of plastic, glass, and/or the like. The cover substrate 10 can include a flat part and a curvature part. The flat part can be flatly provided in a center area of the cover substrate 10. The curvature part can be provided in at least one edge of the cover substrate 10 to have a first curvature. In FIG. 3, the curvature part is illustrated as being provided in each of both edges of the cover substrate 10, but embodiments of the present disclosure are not limited thereto. For example, in embodiments of the present disclosure, the curvature part can be provided in only one edge of the cover substrate 10, or can be provided in each of three edges or four edges. Also, in embodiments of the present disclosure, the cover substrate 10 can include only the flat part.

The cover substrate 10 can include a decoration layer 11. The decoration layer 11 can be a layer including a pattern which is seen by a user even when the display panel 30 does not display an image. The decoration layer 11 can include a letter pattern 11a and a color layer 11b. The letter pattern 11a can be a logo of a company such as "LG". The color layer 11b can be provided in an area corresponding to a bezel area of the display panel 30. In a case where the color layer 11b is provided in black, when the display panel 30 does not display an image, the color layer 11b can be shown in the same color as that of a display area of the display panel 30, and thus, a screen of the display panel 30 is widely seen by a user.

The adhesive film 20 can be disposed on a rear surface of the cover substrate 10. The adhesive film 20 can attach the cover substrate 10 on a polarization film of the display panel 30. The adhesive film 20 can be an optically cleared resin (OCR) or an optically cleared adhesive (OCA) film.

The display panel 30 can be disposed on the rear surface of the cover substrate 10. The display panel 30 can be disposed on the flat part and the curvature part of the cover substrate 10. Since the display panel 30 is disposed even in the curvature part of the cover substrate 10, a user can see an image even through the curvature part of the cover substrate 10.

The display panel 30 can include a first substrate and a second substrate. The first substrate can include a plastic film and a support substrate. The plastic film can be a polyimide film, and the support substrate can be polyethylene terephthalate (PET). The second substrate can be an encapsulation film (a barrier film).

The display panel 30 can include a display area AA and a non-display area NAA provided near the display area AA as in FIG. 4. The display area AA can be an area where a plurality of pixels P are provided to display an image. A plurality of data lines D1 to Dm (where m is a positive integer equal to or more than two) and a plurality of scan lines S1 to Sn (where n is a positive integer equal to or more than two) can be provided in the display panel 30. The data lines D1 to Dm and the scan lines S1 to Sn can be provided to intersect one another. Also, a first power line for supplying a first source voltage corresponding to a high-level voltage and a second power line for supplying a second source voltage corresponding to a low-level voltage can be provided in the display panel 30.

Each of the pixels P of the display panel 30 can be connected to at least one data line and at least one scan line. Each of the pixels P of the display panel 30 can include a driving transistor, at least one switching transistor controlled by scan signals of scan lines, a light emitting element, and a capacitor. In this case, the driving transistor and the at least one switching transistor can each be a thin film transistor (TFT).

Moreover, a scan driver 63 can be provided in the display panel 30 in a gate driver in panel (GIP) type. The scan driver 63 can be disposed on only one side of the display panel 30, or can be disposed on each of both sides of the display panel 30.

The scan driver 63 can be connected to the scan lines S1 to Sn and can supply the scan signals to the scan lines S1 to Sn. The scan driver 63 can sequentially supply the scan signals to the scan lines S1 to Sn according to a scan control signal SCS input from the timing control circuit (or a timing controller) 62.

The display panel 30 can include a bending part 35 which is provided by extending a portion of at least one side of the display panel 30. For example, as in FIG. 3, the bending part 35 can be provided by extending a portion of one side of the display panel 30. The flexible film 50 can be attached on the bending part 35, and in order to minimize a bezel area, the bending part 35 and the flexible film 50 can be bent toward a rear surface of the display panel 30 and can be attached on and fixed to the heat dissipation film 40. The flexible film 50 can be implemented as a chip on film (COF) with the integration control unit 60 mounted thereon.

The heat dissipation film 40 can be disposed on the rear surface of the display panel 30. The heat dissipation film 40 can include a material having high thermal conductivity so as to effectively dissipate heat occurring in the display panel 30. Also, the heat dissipation film 40 can perform a buffering function for protecting the display panel 30 from an external impact. The heat dissipation film 40 can be removed from a fingerprint scanning area FA where the fingerprint scanner 70 is disposed.

The integration control unit 60 can be implemented as a chip type like an integrated chip (IC) and can be attached on the flexible film 50 in a COF type. The integration control unit 60 can be a driving circuit into which the data driving circuit (or data driver) 61, the timing control circuit 62, a power supply circuit, and a gamma voltage circuit are integrated.

The data driving circuit 61 can be connected to the data lines D1 to Dm and can respectively supply data voltages to the data lines D1 to Dm. The data driving circuit 61 can receive digital video data DATA and a source timing control signal DCS from the timing control circuit 62. The data driving circuit 61 can convert the digital video data DATA into data voltages to respectively supply the data voltages to the data lines D1 to Dm according to the source timing control signal DCS.

The timing control circuit 62 can receive the digital video data DATA from an application chip of the portable electronic device PED of FIG. 2. The timing control circuit 62 can generate timing control signals for controlling an operation timing of each of the data driving circuit 61 and the scan driver 63. The timing control signals can include the source timing control signal DCS for controlling the operation timing of the data driving circuit 61 and the scan timing control signal SCS for controlling the operation timing of the scan driver 63. The timing control circuit 62 can output the digital video data DATA and the source timing control signal DCS to the data driving circuit 61. The timing control circuit 62 can output the scan timing control signal SCS to the scan driver 63.

Moreover, the timing control circuit 62 can receive an illumination value IV, obtained by an illumination sensor IS, from the application chip of the portable electronic device PED of FIG. 2. The timing control circuit 62 can vary a fingerprint scanning area and a boundary area, based on the illumination value IV. This will be described below in detail with reference to FIGS. 10, 11A, and 11B.

The power supply circuit can receive a main voltage from a battery of the portable electronic device PED of FIG. 2, generate the first source voltage from the main voltage to supply the first source voltage to the first power line, and generate the second source voltage to supply the second source voltage to the second power line. Also, the power supply circuit can supply driving voltages to the data driving circuit 61, the timing control circuit 62, and the scan driver 63 of the integration control unit (or an integration driver) 60.

The gamma voltage circuit can generate gamma voltages and can supply the gamma voltages to the data driving circuit 61.

The fingerprint scanner 70 can be disposed on the rear surface of the display panel 30 in the fingerprint scanning area FA. The fingerprint scanner 70 can identify a fingerprint of a user by using an optical type.

The fingerprint scanner 70 can include an optical sensor which receives light, reflected by a fingerprint of a finger, of lights emitted from the pixels P of the display panel 30 and converts the received light into an electrical signal. The optical sensor can be a complementary metal oxide semiconductor (CMOS) image sensor or a charge coupled device (CCD) image sensor. In this case, the light emitted from the display panel 30 can be reflected and absorbed by a ridge and a valley of a fingerprint of a finger located in the fingerprint scanning area FA, and thus, fingerprint pattern information about the finger can be sensed by the optical sensor of the fingerprint scanner 70.

The fingerprint scanner 70 can be mounted on the circuit board 80 as in FIG. 3. The circuit board 80 can be a printed circuit board (PCB) or a flexible printed circuit board (FPCB). The circuit board 80 can be connected to a connector which is to be connected to a cable connected to an application board of the portable electronic device PED of FIG. 2. An application chip can be mounted on the application board. Therefore, information about fingerprint authentication by the fingerprint scanner 70 can be transmitted to the application chip of the portable electronic device PED through the circuit board 80, and the application chip can execute an application or can convert a screen, based on the information about the fingerprint authentication.

At least one side of the circuit board 80 can be attached on a rear surface of the heat dissipation film 40 by an adhesive layer 21 as in FIG. 5. In order to increase an adhesive force with which the circuit board 80 is attached on the heat dissipation film 40, all of four edges of the circuit board 80 can be attached on the rear surface of the heat dissipation film 40 by the adhesive layer 21. The adhesive layer 21 can be an OCR or an OCA film.

If the circuit board 80 is attached on the rear surface of the heat dissipation film 40 by the adhesive layer 21, a sum of a height of the heat dissipation film 40 and a height of the adhesive layer 21 can be greater than a height of the fingerprint scanner 70. In this case, a gap can be provided between the fingerprint scanner 70 and the display panel 30. Therefore, the fingerprint scanner 70 can be disposed on the rear surface of the display panel 30 even without being directly attached on the display panel 30. Therefore, since the fingerprint scanner 70 should not be directly attached on the rear surface of the display panel 30 by using a transparent adhesive film, a pressed mark is prevented from being perceived due to the transparent adhesive film.

Figure 6:
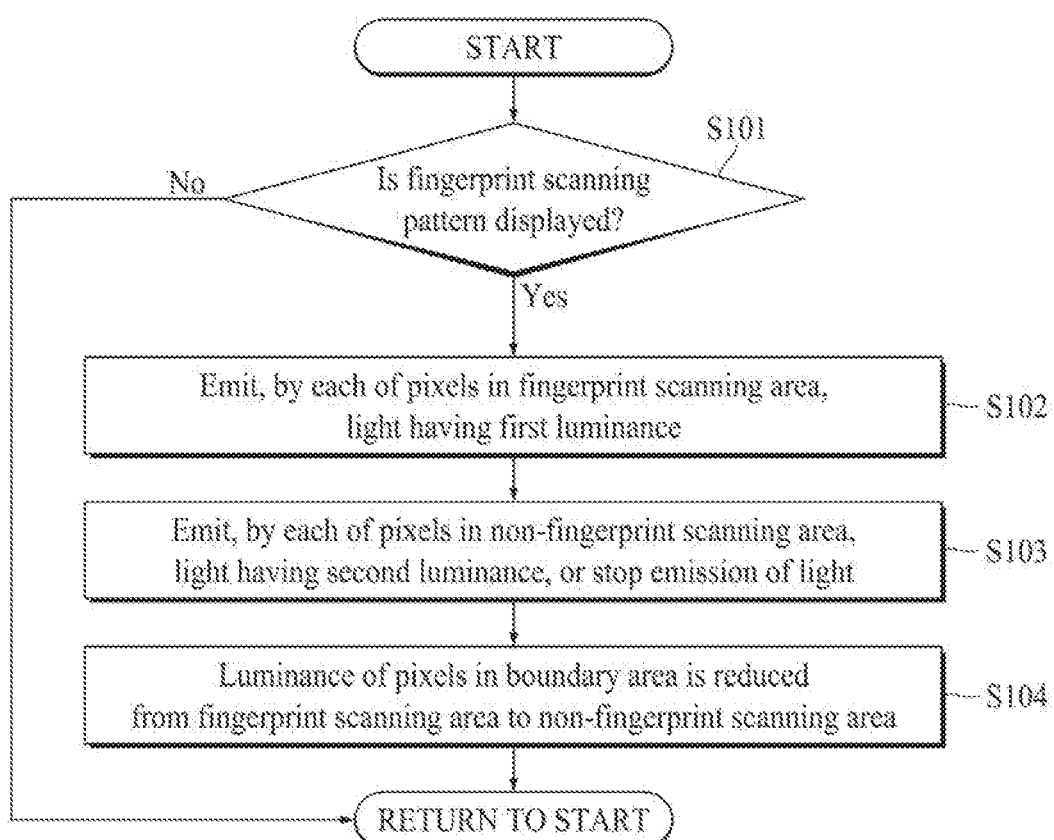
FIG. 6 is a flowchart illustrating a driving method of a light emitting display device according to an embodiment of the present disclosure.

FIG. 6 is a flowchart illustrating a driving method of a light emitting display device according to an embodiment of the present disclosure. All the various methods discussed in the present application may be implemented by using or in any of the devices discussed in the present application.

Referring to FIG. 6, first, the light emitting display device DIS can determine whether to display a fingerprint scanning pattern (i.e., a predetermined image pattern). (S101 of FIG. 6)

In detail, when a user requests fingerprint scanning, the application chip of the portable electronic device PED can issue a request, to the display panel 30, to display a fingerprint scanning pattern. For example, the timing control circuit 62 of the integration control unit 60 can receive a fingerprint scanning pattern signal. In this case, when the fingerprint scanning pattern signal having a first logic level voltage is input, the timing control circuit 62 of the integration control unit 60 can control the display panel 30 to display the fingerprint scanning pattern. On the other hand, when the fingerprint scanning pattern signal having a second logic level voltage is input, the timing control circuit 62 of the integration control unit 60 can control the display panel 30 to display an image, based on the digital video data DATA input from the application chip of the portable electronic device PED.

Subsequently, in a case where the light emitting display device DIS displays the fingerprint scanning pattern, the light emitting display device DIS can perform control in order for lights having different luminances to be emitted from pixels in a fingerprint scanning area FA, pixels in a non-fingerprint scanning area NFA, and pixels in a boundary area BA.

Figure 7:
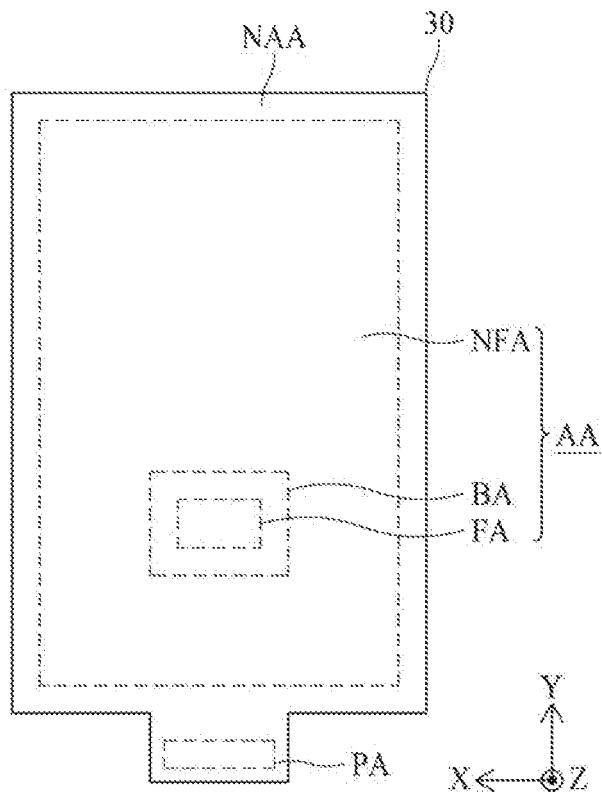
FIG. 7 is a plan view illustrating a fingerprint scanning area, a boundary area, and another region of a display area according to an embodiment of the present disclosure.

The display panel 30 can be divided into the display area AA and the non-display area NAA as in FIG. 7, and the display area AA can be divided into the fingerprint scanning area FA, the non-fingerprint scanning area NFA, and the boundary area BA. The fingerprint scanning area FA can be an area where a finger of a user is located in fingerprint scanning, and can be an area corresponding to the fingerprint scanner 70 disposed on the rear surface of the display panel 30. The fingerprint scanning area FA is illustrated as being disposed close to the non-display area NAA where a pad part PA is provided, but embodiments of the present disclosure are not limited thereto. The non-fingerprint scanning area NFA can be an area irrelevant to fingerprint scanning and can be an area other than the fingerprint scanning area FA. The boundary area BA can be an area disposed between the fingerprint scanning area FA and the non-fingerprint scanning area NFA.

Hereinafter, for convenience of description, an example where the fingerprint scanning area FA is a first area and the non-fingerprint scanning area NFA is a second area will be described.

In a case where the display panel 30 displays a fingerprint scanning pattern, each of pixels P in a first area FA can emit light having a first luminance. The first luminance can be a maximum luminance of each of the pixels P. For example, in a case where the pixels P display 255 gray levels, the first luminance can be a luminance of when each of the pixels P displays a 255 gray level which is a maximum gray level. (S102 of FIG. 6)

Pixels P in a second area NFA can emit light having a second luminance lower than the first luminance, or cannot emit light. The second luminance can be a minimum luminance of each of the pixels P. For example, in a case where the pixels P display 255 gray levels, the second luminance can be a luminance of when each of the pixels P displays a 0 gray level which is a minimum gray level. The second luminance can be substantially the same luminance as the luminance of when the pixels P do not emit light. Alternatively, in a case where the pixels P display 255 gray levels, the second luminance can be the luminance of when each of the pixels P displays a black gray level. The black gray level can be 0 to 63 gray levels. (S103 of FIG. 6)

Figure 8:
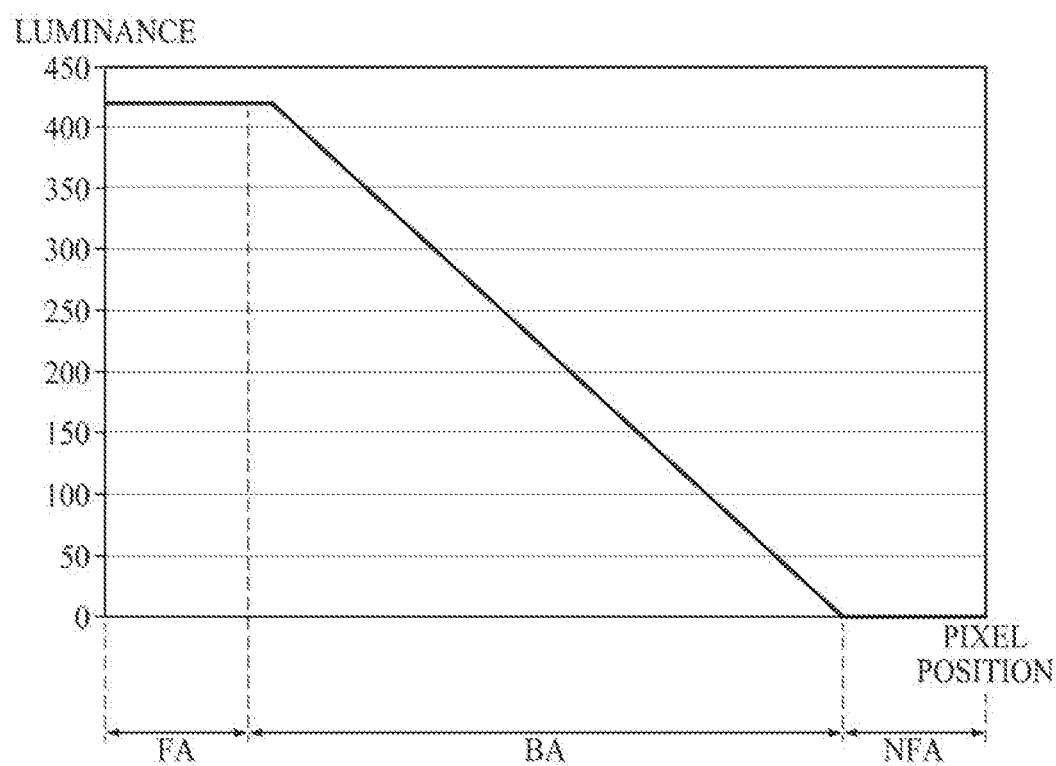
FIG. 8 is a graph showing a luminance of pixels in a fingerprint scanning area, a boundary area, and another region when pixels display a fingerprint scanning pattern, according to an embodiment of the present disclosure.
Figure 9A:
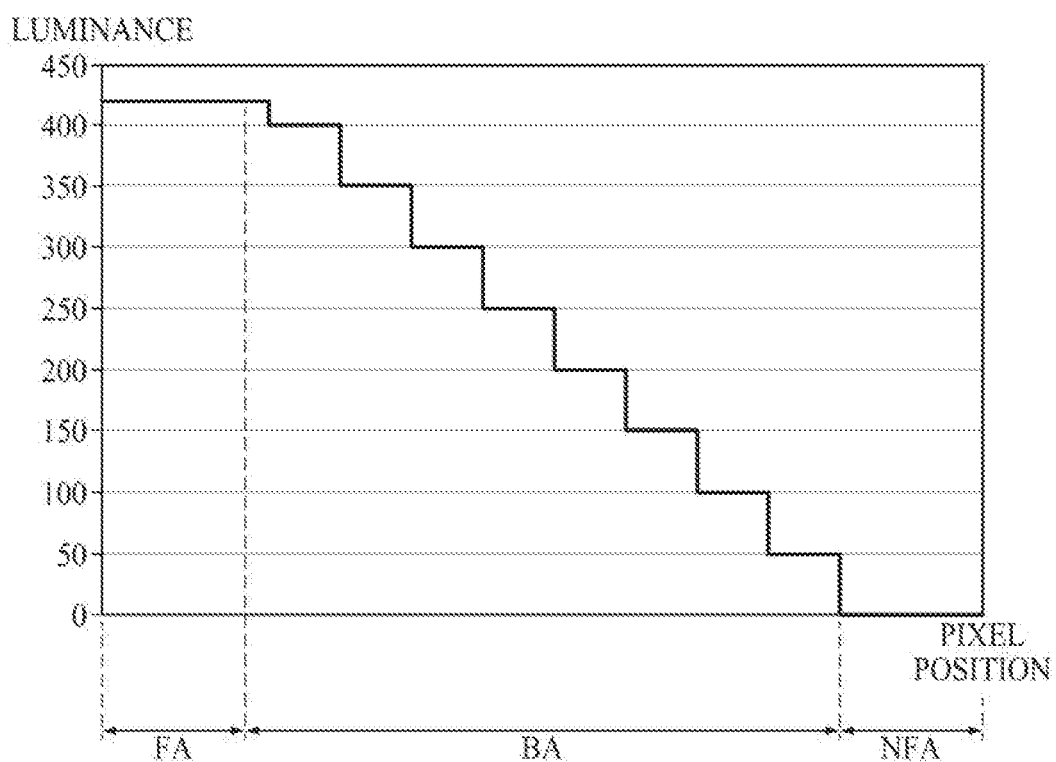
FIG. 9A is a graph showing an example where a luminance of pixels in a boundary area is lowered in a stepped shape.

The luminance of pixels P in the boundary area BA can be lowered from the first area FA to the second area NFA, namely, as the pixels P become farther away from the first area FA and the pixels P get closer to the second area NFA. For example, in the boundary area BA between the first area FA and the second area NFA, the area closer to the first area FA has a higher luminance, and the area closer to the second area NFA has a lower luminance. That is, the luminance of the pixels P in the boundary area BA can have gradation in which the luminance can be getting lowered from the area closer to the first area FA to the area closer to the second area NFA. For example, as in FIG. 8, the luminance of the pixels P in the boundary area BA can be linearly reduced from the first area FA to the second area NFA. FIG. 8 shows an example where the luminance of the pixels P in the boundary area BA is linearly reduced from the first area FA to the second area NFA, but embodiments of the present disclosure are not limited thereto. In other embodiments, as in FIG. 9A, the luminance of the pixels P in the boundary area BA is reduced in a stepped shape from the first area FA to the second area NFA. In this case, it can be set that luminance is reduced in units of predetermined X (where X is a positive integer) pixels. (S104 of FIG. 6)

In order for the luminance of the pixels P in the boundary area BA to be reduced linearly or in a stepped shape, a gray level value of each of the pixels P can be calculated by using the following Equation (1) based on a 2.2 gamma characteristic:

$$TV = ML \times (GV/255)^{2.2} \quad (1)$$

where TV denotes a target luminance, ML denotes a maximum luminance, GV denotes a gray level value for enabling light having the target luminance to be emitted. In Equation (1), the number of gray level values displayable by the pixels P is set to 255.

Figure 9B:
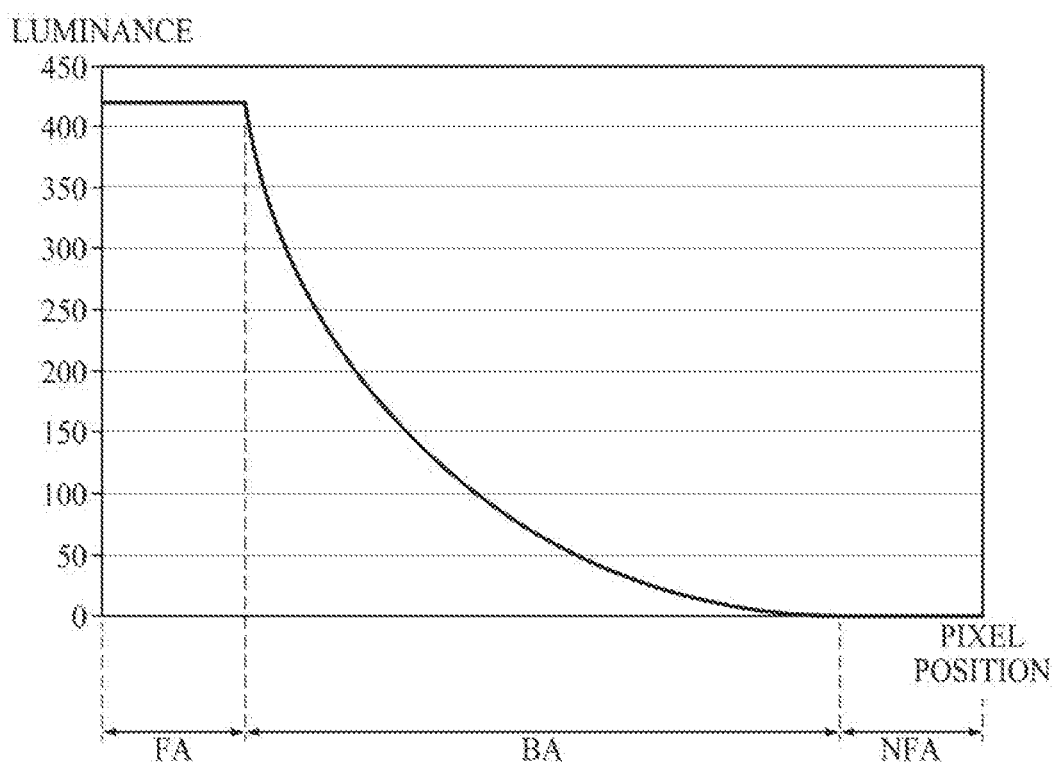
FIG. 9B is a graph showing an example where a luminance of pixels in a boundary area is lowered like an exponential function.

Without using Equation (1), in a case where a gray level value of each of pixels P is reduced linearly or in a stepped shape from the first area FA to the second area NFA, a luminance of the pixels P is reduced like an exponential function as in FIG. 9B.

As described above, the luminance of pixels P in the boundary area BA is lowered as being far away from the first area FA. That is, the luminance of pixels P in the boundary area BA is lowered as being closer to the second area NFA. Therefore, the accumulated stresses of the pixels P in the boundary area BA are more reduced than the accumulated stresses of the pixels P in the first area FA as being far away from the first area FA. In the case that there is no boundary area BA having the gradation, a luminance difference occurring in a boundary between the first area FA and the second area NFA is not perceived by a user. In addition, in that case, the accumulated stress of two pixels which are closed each other at the boundary of the first area FA and the second area NFA can be increased by the luminance difference between them. Further, the accumulated stress difference between two neighbored pixels can reduce the life time of the display panel 30. However, like the embodiment of the present disclosure, as the boundary area BA having the gradation is formed, the accumulation stress difference between the two neighboring pixels P in the boundary area BA is reduced. For example, the accumulated stress difference between two pixels can be reduced in which one pixel is disposed in the first area FA and the other pixel is disposed in the boundary area BA. Also, the accumulated stress difference between two pixels can be reduced in which one pixel is disposed in the second area NFA and the other pixel is disposed in the boundary area BA. Further, the accumulated stress difference between two neighboring pixels in the boundary area BA can be reduced.

Figure 10:
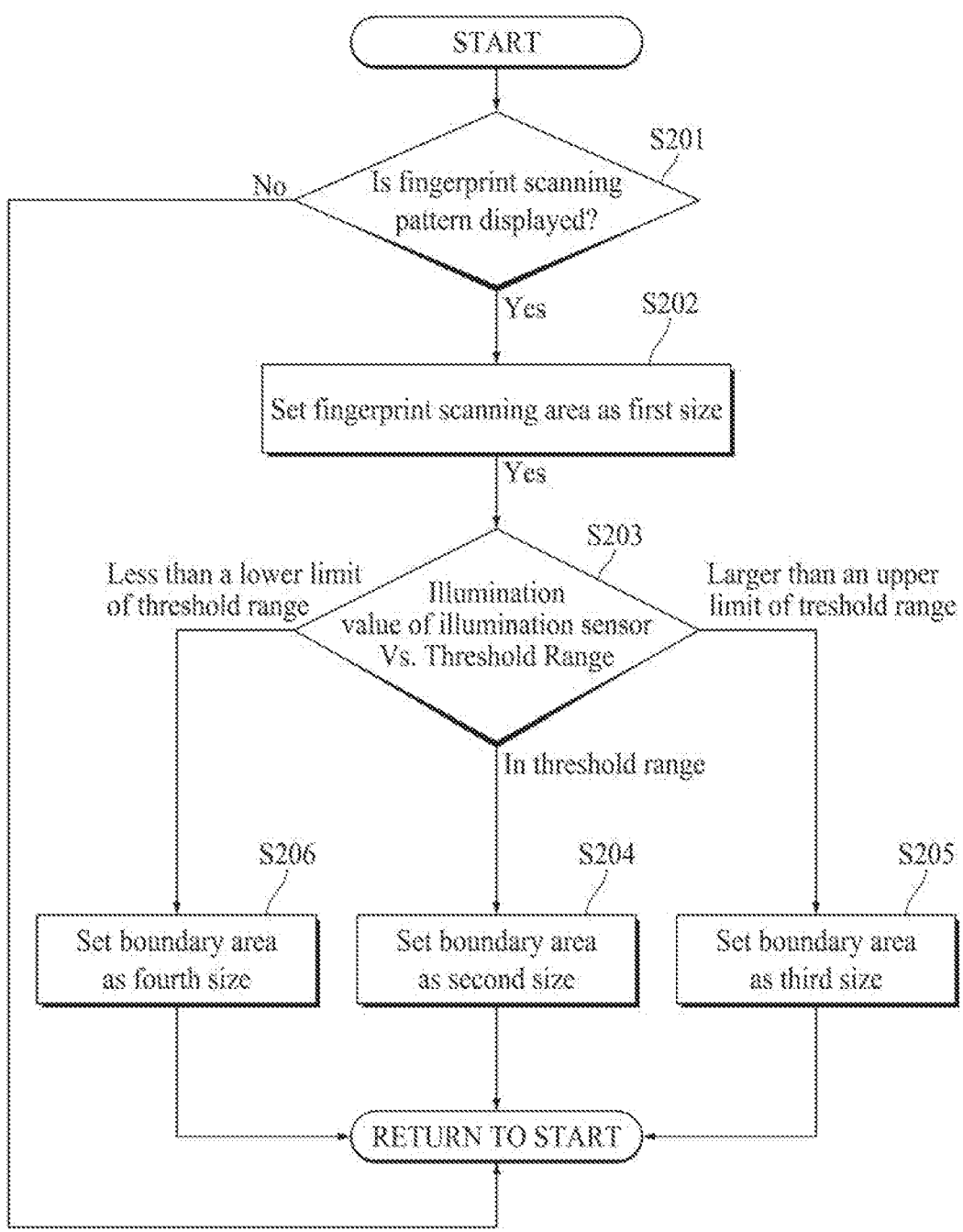
FIG. 10 is a flowchart illustrating a driving method of a light emitting display device according to another embodiment of the present disclosure.

FIG. 10 is a flowchart illustrating a driving method of a light emitting display device according to one embodiment of the present disclosure.

Referring to FIG. 10, at first, the light emitting display device DIS can determine whether to display a fingerprint scanning pattern. (S201 of FIG. 10)

In detail, when a user requests fingerprint scanning, the application chip of the portable electronic device PED can issue a request, to the display panel 30, to display a fingerprint scanning pattern. For example, the integration control unit 60 can receive a fingerprint scanning pattern signal. In detail, the timing control circuit 62 of the integration control unit 60 can receive a fingerprint scanning pattern signal. In this embodiment, we explain about the case in which the timing control circuit 62 can control the display panel 30 to display a fingerprint scanning pattern. In this case, when the fingerprint scanning pattern signal having a first logic level voltage is input, the timing control circuit 62 of the integration control unit 60 can control the display panel 30 to display the fingerprint scanning pattern. On the other hand, when the fingerprint scanning pattern signal having a second logic level voltage is input, the timing control circuit 62 of the integration control unit 60 can control the display panel 30 to display an image, based on the digital video data DATA input from the application chip of the portable electronic device PED.

Secondly, the light emitting display device DIS can determine the first area FA to a first size as for the fingerprint recognizing area. (S202 of FIG. 10)

In detail, the timing control circuit 62 of the integration control unit 60 can determine the first area FA to a first size. After that, the timing control circuit 62 can control the pixels P in the first area FA to emit the lights having a first luminance and the pixels P in the second area NFA not recognizing the fingerprint to emit the lights having a second luminance lower than the first luminance or not to emit any lights.

Thirdly, the light emitting display device DIS can determine whether an illumination value IV from the illumination sensor IS is less than a lower limit of a threshold range or larger than an upper limit of the threshold range. (S203 of FIG. 10)

In detail, the timing control circuit 62 of the integration control unit 60 can receive the illumination value IV of the illumination sensor IS from an application chip. The timing control circuit 62 can determine whether the illumination value IV is less than the lower limit fo the threshold range, inside the threshold range, or larger than the upper limit of the threshold range. The threshold range can be 30~300 Lx. However, the threshold range is not limited thereto, it can be set variously. For example, the threshold range can be set to 60~200 Lx.

Figure 11A:
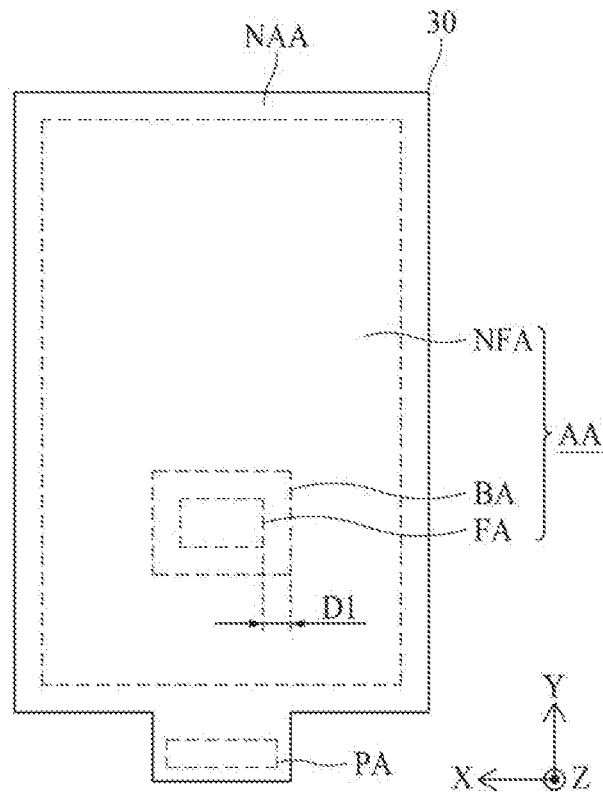

At fourth, if the illumination value IV is in the threshold range, as in FIG. 11A, the light emitting display device DIS can set a first area FA as a first size and can set a boundary area BA as a second size. (S204 of FIG. 10)

In detail, if the illumination value IV of the illumination sensor IS is in the threshold range, the timing control circuit 62 of the integration control unit 60 can set the first area FA as the first size and can set the boundary area BA as the second size. Subsequently, the timing control circuit 62 can perform control so that each of pixels P in the first area FA emits the light having first luminance, each of pixels P in a second area NFA emits the light having a second luminance lower than the first luminance or does not emit any light. Further, the timing control circuit 62 can perform control so that the luminance of pixels P in the boundary area BA disposed between the first area FA and the second area NFA is reduced from the first area FA to the second area NFA. When the illumination value IV is in the threshold range, the width of the boundary area BA disposed between the first area FA and the second area NFA can have a first distance D1. As the boundary area BA having the gradation is formed according to the embodiment of the present disclosure, the accumulated stress difference between neighboring pixels is reduced so that the life time of the display panel 30 can be enhanced or elongated.

Figure 11B:
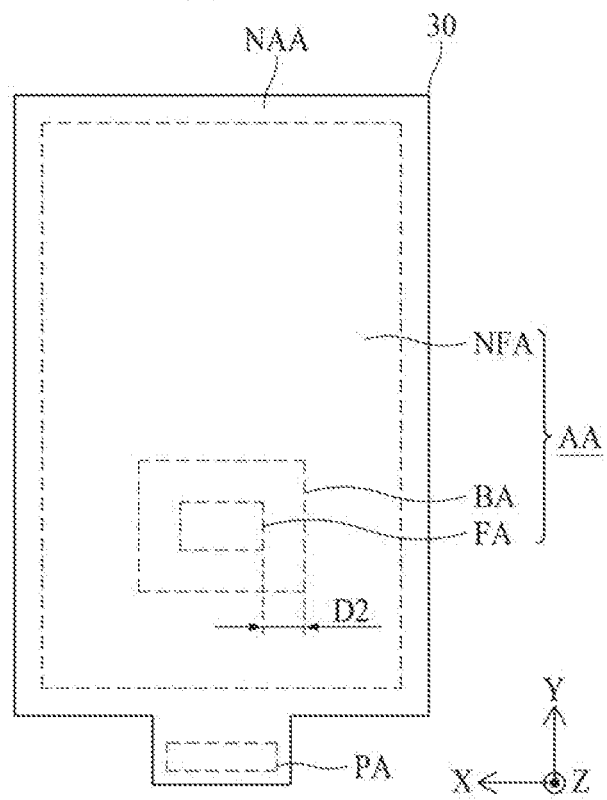

If the illumination value IV is greater than the upper limit of the threshold range, as in FIG. 11B, the first area FA can have the first size and the boundary area BA can have a third size wider than the second size. (S205 of FIG. 10)

In detail, if the illumination value IV is greater than the upper limit of the threshold range, the timing control circuit 62 of the integration control unit 60 can set the first area FA as the first size and can set the boundary area BA as the third size. Here, the third size can be wider than the second size. Subsequently, the timing control circuit 62 can perform control so that each of the pixels P in the first area FA emits the light having the first luminance, each of the pixels P in the second area NFA emits the light having the second luminance lower than the first luminance or does not emit any light. In addition, the timing control circuit 62 can perform control so that the luminance of each of the pixels P in the boundary area BA is reduced from the first area FA to the second area NFA. Further, when the illumination value IV is greater than the upper limit of the threshold range, the width of the boundary area BA disposed between the first area FA and the second area NFA can have a second distance D2 larger than the first distance D1.

When the illumination value IV is greater than the upper limit of the threshold range, it can be considered that a user is located in an environment where external light is bright. Therefore, even when the size of the boundary area BA is enlarged from the second size to the third size, the eyes of the user do not feel fatigue or inconvenience caused by the fingerprint scanning pattern of the display panel 30. In addition, as the boundary area BA having the gradation is getting larger, the accumulated stress difference between neighboring pixels is more reduced, so that the life time of the display panel 30 can be enhanced.

When the illumination value IV is less than the lower limit of the threshold range, as in FIG. 11C, the light emitting display device DIS can set the first area FA as the first size and can set the boundary area BA as a fourth size narrower than the second size. (S206 of FIG. 10)

In detail, if the illumination value IV is less than the lower limit of the threshold range, the timing control circuit 62 of the integration control unit 60 can set the first area FA as the first size and can set the boundary area BA as the fourth size narrower than the second size. Subsequently, the timing control circuit 62 can perform control so that each of the pixels P in the first area FA emits the light having the first luminance, each of the pixels P in the second area NFA emits the light having the second luminance lower than the first luminance or does not emit any light. In addition, the timing control circuit 62 can perform control so that the luminance of the pixels P in the boundary area BA disposed between the first area FA and the second area NFA is gradually reduced from the first area FA to the second area NFA. Further, when the illumination value IV is less than the lower limit of the threshold range, the width of the boundary area BA disposed between the first area FA and the second area NFA can have a third distance D3 smaller than the first distance D1.

If the illumination value IV is less than the lower limit of the threshold range, it can be considered that a user is located in a dark environment where external light is murky. Here, when an area of the boundary area BA is wide, the eyes of the user can feel fatigue or inconvenience caused by easily recognizing the boundary area BA. Therefore, by reducing an area of the boundary area BA having the gradation, the eyes of the user can not be recognizing the boundary area BA. As a result, the fatigue or inconvenience which the eyes of the user feel due to the fingerprint scanning pattern of the display panel 30 is minimized.

The light emitting display device and the driving method of the light emitting display device can be explained as follows.

A light emitting display device according to an embodiment of the present disclosure can include a display panel including a display area where a plurality of pixels are provided to display an image, the display area including a first area, a second area, and a boundary area disposed between the first area and the second area. In a case where the display panel displays a predetermined image pattern, pixels in the first area emit a first light having a first luminance. Pixels in the second area emit a second light having a second luminance lower than the first luminance or no light. And pixels in the boundary area emit a third light having a third luminance reduced from the first area to the second area.

In one embodiment, the light emitting display device further can include a fingerprint scanner on a rear surface of the display panel. The fingerprint scanner is disposed at an area corresponding to the predetermined image pattern.

In one embodiment, the first area is corresponding to the predetermined image pattern.

In one embodiment, in a case where the display panel displays the predetermined image pattern, the third luminance of the pixels in the boundary area is reduced linearly or in a stepped shape from the first area to the second area.

In one embodiment, in order for the third luminance of the pixels in the boundary area to be reduced, a gray level value of each of the pixels is calculated by using Equation: $TV=ML \times (GV/255)^{2.2}$. Here, TV denotes a target luminance, ML denotes a maximum luminance, GV denotes a gray level value for enabling light having the target luminance to be emitted, and 255 is the number of gray level values displayable by the pixels.

In one embodiment, the light emitting display device can further include a timing controller receiving an illumination value of an illumination sensor, and when the illumination value is in a threshold range, setting the first area as a first size and setting the boundary area as a second size.

In one embodiment, the timing controller sets the boundary area as a third area larger than the second area, when the illumination value is greater than the upper limit of the threshold range.

In one embodiment, the timing controller sets the boundary area as a fourth size narrower than the second size, when the illumination value is less than the lower limit of the threshold range.

A driving method of a light emitting display device including a display panel according to one embodiment of the present disclosure can include when the display panel displays a fingerprint scanning pattern, emitting, by each of pixels in a first area, light having a first luminance; emitting, by each of pixels in a second area, light having a second luminance lower than the first luminance or stopping emission of light; and emitting, by each of pixels in a boundary area between the first area and the second area, light having a third luminance which is reduced from the first area to the second area.

In one embodiment, the first area is an area corresponding to a fingerprint scanner disposed on a rear surface of the display panel.

In one embodiment, in the emitting of the light having the third luminance reduced from the first area to the second area, the third luminance of the pixels in the boundary area is reduced linearly or in a stepped shape from the first area to the second area.

In one embodiment, in the emitting of the light having the third luminance reduced from the first area to the second area, in order for the luminance of the pixels in the boundary area to be reduced, a gray level value of each of the pixels is calculated by using Equation: $TV=ML \times (GV/255)^{2.2}$. Here, TV denotes a target luminance, ML denotes a maximum luminance, GV denotes a gray level value for enabling light having the target luminance to be emitted, and 255 is the number of gray level values displayable by the pixels.

In one embodiment, the driving method can further include a step for setting the first area as a first size and setting the second area as a second size, when an illumination value of an illumination sensor is in a threshold range, In one embodiment, the driving method can further include a step for setting the first area as the first size and setting the boundary area as a third area larger than the second area, when the illumination value is greater than the upper limit of the threshold range.

In one embodiment, the driving method can further include a step for setting the first area as the first size and setting the boundary area as a fourth size smaller than the second size when the illumination value is less than a lower limit of the threshold range.

As described above, according to the embodiments of the present disclosure, when the fingerprint scanning pattern is displayed, control can be performed so that the luminance of pixels in the boundary area is lowered progressively from the fingerprint scanning area to the non-fingerprint scanning area. As a result, in the embodiments of the present disclosure, the accumulated stresses of the pixels in the boundary area are reduced more than the accumulated stresses of pixels in the fingerprint scanning area from the fingerprint scanning area to the non-fingerprint scanning area, and increased more than the accumulated stresses of pixels in the non-fingerprint scanning area as the pixels get closer to the fingerprint scanning area. Therefore, in the embodiments of the present disclosure, an accumulation stress difference between the pixels in the boundary area is reduced, and thus, a luminance difference occurring in a boundary between the fingerprint scanning area and the non-fingerprint scanning area is not perceived by a user.

Moreover, in the embodiments of the present disclosure, when it is determined that a user is located in a dark environment where external light is small, an area of the fingerprint scanning area where each of the pixels emits light having a first luminance is reduced, and thus, fatigue or inconvenience which the eyes of the user feel due to the fingerprint scanning pattern displayed by the display panel is minimized.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light emitting display device comprising:
a display panel including a display area where a plurality of pixels are provided to display an image, the display area including a first area, a second area, and a boundary area disposed between the first area and the second area; and
a timing controller configured to receive an illumination value of an illumination sensor, and when the illumination value is in a threshold range, set the first area as a first size and set the boundary area as a second size,
wherein, when the display panel displays a predetermined image pattern, pixels in the first area emit a first light having a first luminance, pixels in the second area emit a second light having a second luminance lower than the first luminance or emit no light, and pixels in the boundary area emit a third light having a third luminance reduced from the first area to the second area.

2. The light emitting display device of claim 1, further comprising a fingerprint scanner on a rear surface of the display panel,
wherein the fingerprint scanner is disposed at an area corresponding to the predetermined image pattern.

3. The light emitting display device of claim 2, wherein the first area corresponds to the predetermined image pattern.

4. The light emitting display device of claim 1, wherein when the display panel displays the predetermined image pattern, the third luminance of the pixels in the boundary area is reduced linearly or in a stepped shape from the first area to the second area.

5. The light emitting display device of claim 4, wherein in order for the third luminance of the pixels in the boundary area to be reduced, a gray level value of each of the pixels is calculated by using a following equation:

$TV=ML \times (GV/255)^{2.2}$, wherein TV denotes a target luminance, ML denotes a maximum luminance, GV denotes a gray level value for enabling light having the target luminance to be emitted, and 255 is the number of gray level values displayable by the pixels.

6. The light emitting display device of claim 1, wherein the timing controller sets the boundary area as a third area larger than the second area, when the illumination value is greater than an upper limit of the threshold range.

7. The light emitting display device of claim 1, wherein the timing controller sets the boundary area as a fourth size narrower than the second size, when the illumination value is less than a lower limit of the threshold range.

8. A driving method of a light emitting display device including a display panel, the driving method comprising:
when the display panel displays a fingerprint scanning pattern, emitting, by each of pixels in a first area, light having a first luminance;
emitting, by each of pixels in a second area, light having a second luminance lower than the first luminance or stopping emission of light;
emitting, by each of pixels in a boundary area between the first area and the second area, light having a third luminance which is reduced from the first area to the second area; and
setting the first area as a first size and setting the second area as a second size, when an illumination value of an illumination sensor is in a threshold range.

9. The driving method of claim 8, wherein the first area is an area corresponding to a fingerprint scanner disposed on a rear surface of the display panel.

10. The driving method of claim 8, wherein in the emitting of the light having the third luminance reduced from the first area to the second area, the third luminance of the pixels in the boundary area is reduced linearly or in a stepped shape from the first area to the second area.

11. The driving method of claim 10, wherein in the emitting of the light having the third luminance reduced from the first area to the second area,
in order for the luminance of the pixels in the boundary area to be reduced, a gray level value of each of the pixels is calculated by using a following equation:

$TV=ML \times (GV/255)^{2.2}$, wherein TV denotes a target luminance, ML denotes a maximum luminance, GV denotes a gray level value for enabling light having the target luminance to be emitted, and 255 is the number of gray level values displayable by the pixels.

12. The driving method of claim 8, further comprising:
setting the first area as the first size and setting the boundary area as a third area larger than the second area, when the illumination value is greater than an upper limit of the threshold range.

13. The driving method of claim 8, further comprising:
setting the first area as the first size and setting the boundary area as a fourth size smaller than the second size, when the illumination value is less than a lower limit of the threshold range.

* * * * *